United States Patent [19]

Smrt et al.

[11] Patent Number: 5,156,765
[45] Date of Patent: Oct. 20, 1992

[54] AEROSOL FOAM MARKING COMPOSITIONS

[75] Inventors: Thomas J. Smrt, Marengo; Walter S. Mierzwinski, Schaumburg, both of Ill.

[73] Assignee: Fox Valley Systems, Inc., Cary, Ill.

[21] Appl. No.: 523,886

[22] Filed: May 15, 1990

[51] Int. Cl.$^5$ .............................. B01J 13/00; C09K 3/30
[52] U.S. Cl. ...................................... 252/307; 252/305; 252/90; 524/903; 106/30; 424/47
[58] Field of Search .................. 252/305, 307, 90; 524/903; 424/47; 106/19, 30

[56] References Cited

U.S. PATENT DOCUMENTS

| | | | |
|---|---|---|---|
| 3,394,768 | 7/1968 | Chocola et al. | 175/69 |
| 3,442,011 | 1/1969 | Jackovitz et al. | 252/3 |
| 3,705,855 | 12/1972 | Marschner | 252/90 |
| 3,744,718 | 7/1973 | Morley | 239/8 |
| 4,050,944 | 9/1977 | Cartwright | 106/19 |
| 4,161,458 | 7/1979 | Kolleth | 252/305 |
| 4,330,422 | 5/1982 | Tesch | 252/89.1 |
| 4,381,066 | 4/1983 | Page et al. | 222/394 |
| 4,417,016 | 11/1983 | Cline et al. | 524/156 |
| 4,439,342 | 3/1984 | Albanese | 252/305 |
| 4,442,018 | 4/1984 | Rand | 252/307 |
| 4,482,648 | 11/1984 | Norman | 521/65 |
| 4,595,522 | 6/1986 | Bartlett et al. | 252/305 |
| 4,597,997 | 7/1986 | Weill | 427/288 |
| 4,708,813 | 11/1987 | Snyder | 252/90 |
| 4,806,262 | 2/1989 | Snyder | 252/90 |
| 4,839,198 | 6/1989 | Lonis et al. | 427/137 |
| 4,849,117 | 7/1989 | Bronner et al. | 252/3 |
| 4,957,732 | 9/1990 | Grollier et al. | 424/73 |
| 5,030,443 | 7/1991 | Varco et al. | 424/47 |

FOREIGN PATENT DOCUMENTS

2058820 4/1981 United Kingdom.
2085025 4/1982 United Kingdom.

*Primary Examiner*—Richard D. Lovering
*Assistant Examiner*—N. Bhat
*Attorney, Agent, or Firm*—Leydig, Voit & Mayer

[57] ABSTRACT

The present invention contemplates an aerosol composition adapted for providing a foam upon discharge from a suitable containment means, said composition comprising (a) a propellant, (b) water, (c) a water-insoluble polymer, (d) a surfactant, (e) a foam stabilizing agent, and (f) a solvent adapted for solvating said foam stabilizing agent, said foam remaining stable up to about ninety days if left undisturbed.

52 Claims, No Drawings

AEROSOL FOAM MARKING COMPOSITIONS

FIELD OF THE INVENTION

This invention relates generally to aqueous-based aerosol foam marking compositions and, more specifically, to those which are used on the ground and which exhibit favorable characteristics.

BACKGROUND OF THE INVENTION

In the construction industry, paint has been used for many years to mark boundary lines on the ground for the placement of sewer lines, electrical lines and the like. Utility companies have also applied paint onto the ground to mark the location of utility lines to ensure that they will not be disturbed. Although paint is an adequate marking composition for these applications, it tends to leave a rather permanent mark on grass or concrete. Generally, a mark should be able exist for up to a month if left undisturbed in order for it to be deemed useful in these industries but should be easy to remove when the job is completed. In addition, it is difficult to see a painted surface if one is at a distance from the surface.

Various types of foams, which are three-dimensional, a characteristic which serves to increase their visibility at long distances, have been developed for the marking of surfaces. One type of foam has been developed from soaps and detergents, this being exemplified by U.S. Pat. No. 4,597,997 to Weill. This particular foam, which is a water-based foam paint adapted for discharge from an aerosol container, comprises a foam-producing emulsion of the type commonly used in shaving cream, e.g., a mixture of one or more fatty acids and a mixture of caustic potash and caustic soda. A coloring additive is introduced while other components such as emulsifiers, emollients, thickeners, preservatives, and bactericides may also be added. In regard to the propellant, a compressed liquid or gas, such as low boiling hydrocarbons, chlorofluorocarbons, and carbon dioxide, may be employed. A major drawback of soap and detergent-based foams however is their short life, making this type of foam unsuitable for situations wherein a more durable and long-lasting foam is required.

A ground marking foam which is more durable than these aforementioned soap-based foam which can be used to indicate those areas over which fertilizing chemicals have been applied is described in U.S. Pat. No. 4,050,944 to Cartwright. This composition is initially produced in the form of a concentrate which is intended to be diluted at the point of use. The concentrate comprises a surfactant functioning as a foam producing agent (about 5 to 12 wt. percent), a foam stabilizing agent (about 1 to 10 wt. percent), and water (about 70 to 90 wt. percent). Optional components include a water softening ingredient, a buffering agent for stabilizing the pH of the composition, a viscosity reducing agent, and a water coloring ingredient or dye. This composition does not include a propellant intermixed therein nor a polymer or solvent which may enhance the stability of the resulting foam.

Other types of high-expansion foams which contain a polymer are presently known. For example, U.S. Pat. No. 4,442,018 to Rand discloses a foam-forming composition which comprises a water-soluble polymer of the polyacrylic type, a foam stabilizer of dodecyl alcohol, a surfactant, a solvent and water. This concentrate is then diluted at the point of use and is then blown through a screen to produce a foam. The preferred polymer is known by the trademark CARBOPOL 941 (B. F. Goodrich) and is a water-soluble vinyl polymer. However, this composition does not contain a propellant and, as such, is not adapted for delivery from an aerosol containment means.

In comparison, a foam-producing composition that is adapted for discharge from an aerosol container is disclosed in U.S. Pat. No. 3,705,855 to Marschner. This reference is drawn toward a reversible-emulsion aerosol system which comprises two immiscible liquids in emulsified form having water in the dispersed phase and a propellant in the continuous phase. The composition comprises about 35 to about 85 wt. percent water, 10 to 50 wt. percent liquid propellant, 0.1 to about 20 wt. percent of a water-soluble surfactant, and an effective amount of a water-in-oil emulsifier. However, this reference contains no disclosure directed toward the durability or longevity of the resulting foam product.

Foam compositions are also used in the printing industry, specifically as ink carriers. Exemplar of this type of application of foam technology is U.S. Pat. No. 4,482,648 to Norman. This reference discloses foamed ink compositions for use on printing presses and methods for making these inks. The ink disclosed comprises a water-based printing ink, a foaming agent, and a pseudoplastic additive, this ink being foamed by use of a compressed gas. In producing the foam, air is discharged from a nozzle into a chamber while, simultaneously, the composition is also introduced into the chamber. The gas mixes with the composition and flows into a receiving area. The resulting mixture is removed from the receiving area via a foam refining tube and ultimately forms a foamed ink. This ink may further comprise an aqueous pigment dispersion which has about 30 to about 60 wt. percent solids. The solids are generally resins which may be either water-soluble or water-dispersible depending upon the vehicle employed. Foam stability agents may also be employed, such as higher fatty alcohols, e.g., cetyl and stearyl alcohol, and may comprise from about 0.1 to about 10 wt. percent of the composition. Suitable pseudoplastic additives include xantham gum. This reference, however, does not disclose a composition which includes, in a single aerosol package, a foam forming composition and a propellant, which upon discharge produces a stable foam product.

Thus, there exists a need for aerosol foam marking compositions which do not suffer from the disadvantages associated with prior foam marking compositions.

Accordingly, it is an object of the present invention to provide an aqueous-based aerosol foam marking composition, which includes a propellant, wherein the composition produces a foam upon discharge from a pressurized container.

A related object is to provide an aerosol foam marking composition which does not require an additional apparatus to induce foam formation after the composition is discharged from a pressurized container.

A further object is to provide an aerosol foam marking composition which, upon discharge from a pressurized container, will produce a foam that is stable for long periods of time, i.e. from a few hours up to about 90 days, if left undisturbed.

Yet another object is to provide an aerosol foam marking composition in which pigments may be added to the composition to produce a colored foam.

An additional object is to provide an aerosol foam marking composition which is stable when exposed to high temperatures during processing and storage, i.e., between about 80 and 130° F.

These and other objects and advantages of the present invention will become apparent upon review of the following summary and detailed description of the invention.

SUMMARY OF THE INVENTION

In accordance with the foregoing objectives the present invention provides an aerosol composition that provides a foam upon discharge from a suitable containment means, said composition comprising (a) a propellant, (b) water, (c) a water-insoluble polymer, (d) a surfactant, (e) a foam stabilizing agent, and (f) a solvent that solvates said foam stabilizing agent.

DETAILED DESCRIPTION OF THE INVENTION

While the invention will be described in connection with certain preferred embodiments, the invention is not intended to be so limited. On the contrary, the invention is intended to cover all alternatives, modifications, and equivalent arrangements as may be included within the spirit and scope of the invention as defined by the appended claims.

The present invention contemplates an aerosol composition adapted for providing a foam upon discharge from a suitable containment means, said composition comprising (a) a propellant, (b) water, (c) a water-insoluble polymer, (d) a surfactant, (e) a foam stabilizing agent, and (f) a solvent adapted for solvating said foam stabilizing agent.

Turning initially to the propellant, the present invention contemplates the use of any type of propellant or mixture of propellants that will assist in the formation of a foam upon discharge of the composition from a containment means. Typically, liquid propellants are used to provide the requisite foaming characteristic. By use of the term "liquid propellant" in this disclosure, it is contemplated that such propellant is gaseous at room temperature and atmospheric pressure, but liquid under the pressure within an aerosol can.

It is not critical to the invention whether a watermiscible or water-immiscible liquid propellant is used so long as the composition emerges from the containment means as a foam. In addition, the liquid propellant selected should be inert, i.e., it should not react with the components of the composition. One example of a water-miscible propellant is dimethyl ether. The ethers may be used in the present inventive compositions with some degree of success; however, they are not favored due to their cost in comparison to other available propellants. Water-immiscible propellants contemplated by the invention include non-halogenated hydrocarbons other than the ethers, e.g., methane, ethane, propane, and butane, and halogenated hydrocarbons, e.g., Freon 12, as well as mixtures of these various water-immiscible propellants. Use of the halogenated hydrocarbons is presently on the decline, however, due to environmental concerns over their effect on the ozone layer surrounding the earth. As such, use of these types of propellants is not preferred.

Gaseous propellants, i.e., those which remain as a gas when under pressure in an aerosol can, may also be used. As with the liquid propellants, the gaseous propellants should not react with the other components. Examples of suitable gaseous propellants include nitrogen, carbon dioxide, nitrous oxide, argon, helium, and mixtures thereof. To achieve the formation of a foam, a mechanical break-up actuator should be used to provide for atomization of the composition upon discharge. Any type of suitable actuator may be employed, these type of actuators being well known to those skilled in the art.

The quantity of propellant utilized will vary based upon the specific aerosol foam composition formulated. The proportions of the other ingredients in the aerosol as well as the amount of the composition present in the container should be taken into account. Generally, the amount of propellant present should be that which is sufficient to expel substantially all of the composition from the containment means. The sufficiency of propellant, either liquid or gas, in an aerosol container is typically determined by reference to the vapor pressure inside the can. Generally, when the pressure in the can reaches a range of from about 30 to 110 psig at 70° F, a sufficient amount of propellant has been introduced. Preferably, the initial container pressure ranges from about 40 to 80 psig.

In order to reach the aforesaid pressures, the propellant, if a liquid, is generally present in an amount ranging from about 5 to about 40 wt. percent of the composition. Preferably, about 15 to about 25 wt. percent of liquid propellant will be in the composition and most preferably about 18 to 22 wt. percent. If, for example, dimethyl ether is used, amounts at the higher end of the range will be necessary due to its characteristic lowering of vapor pressure upon exposure to solvents. Most liquid hydrocarbons and halogenated hydrocarbons do not suffer from this loss of vapor pressure effect and may therefore be present in amounts ranging toward the lower ends of the aforesaid ranges. Further, the other propellants are typically less expensive than dimethyl ether and are less flammable, such that hydrocarbons other than the ethers are the preferred propellants. When gaseous propellants are used, they will be generally present in an amount which is substantially less, on a weight basis, than a liquid propellant. As such, gas propellants are present in an amount ranging from about 0.1 to about 10 wt. percent of the composition. Preferably, about 0.5 to about 5 wt. percent of gaseous propellant will be in the composition and most preferably about 1 to 3 wt. percent.

Another component utilized in the present invention may be generally described as a polymer. This component assists in stabilizing the resulting foam. A water-insoluble polymer is preferably employed for that purpose with acrylic polymers being particularly appropriate for use herein. One preferred group of polymers contemplated by this invention consists of interpolymers of (i) units from at least one neutral free-radical polymerizable ester having a vinylidene group attached to the functional group, which ester by itself yields a soft linear polymer, for example an acrylic, (ii) units from at least one neutral polymerizable aromatic monovinylidene compound which by itself yields a hard polymer, such as styrene, and (iii) units from at least one neutral polymerizable aliphatic monovinylidene compound substituted by a cyano group and which by itself yields a hard polymer, for example, acrylonitrile. Exemplar of polymers of this type, in aqueous dispersion form, are available from Rohm & Haas, Inc. under the designation "W.L.", for example "W.L. 91." This W.L. dispersion consists of a copolymer of styrene, acrylonitrile, and an acrylate ester present in an amount ranging from about 40 to about 43 wt. percent and a surfactant present in an amount ranging from about 4 to about 6 wt. percent of the dispersion, the balance being water. These type of polymers, i.e., the W.L. series, generally have a molecular weight of about one million.

The Rohm & Haas W.L. polymers described above are particularly preferred because they exhibit an excellent tolerance toward solvents and other organic components that may be incorporated into an aerosol composition. For example, most polymers will coagulate when mixed with the hydrocarbon propellants of the present invention. As such, and in addition to the specific W.L. polymers described above, any polymer that exhibits similar characteristics is also preferred. Such preferred polymers can be generally identified by determining whether the polymer remains in a non-coalesced condition during the time the polymer resides in the containment means despite there being present the organic components which are described herein.

The amount of polymer included in the composition is that amount which will result in a foam having the desired longevity. However, the amount of polymer, in addition to other solids, must be limited such that the total solids content is low enough to allow the composition to be discharged from a standard type of actuator, i.e., without the need for a specialized mechanical break-up type of actuator, when a liquid propellant is used. The ability of the liquid propellant containing composition to be discharged from a standard aerosol can and actuator illustrates one of the economic advantages associated with the present invention. Generally, the amount of polymer solids present in the composition which is adequate to accomplish the foregoing when use of a liquid propellant is contemplated ranges from about 1 to about 25 wt. percent of the total aerosol composition, preferably about 2 wt. to about 15 wt. percent, and most preferably about 3 to about 15 wt. percent of the aerosol composition. Under this scenario, the total solids content should generally range up to about 5 wt. percent of the composition. When a gas propellant is utilized, the solids content may be increased, this ranging from about 15 to about 20 wt. percent of the composition.

The water component of the present invention is generally present in an amount sufficient to allow adequate dispersion of the components as well as to I5 provide the viscosity level necessary for the liquid propellant containing composition to be discharged successfully through a standard actuator. This amount will generally range from about 10 to about 90 wt. percent, preferably from about 40 to about 80 wt. percent, and most preferably about 50 to about 70 wt. percent of the composition. A composition that is comprised of at least about 50 wt. percent water is preferred.

The surfactant used in the present invention has a dual role. More specifically, this component will act as a dispersant for a foam stabilizer as well as a foam-inducing agent. As such, the surfactant selected for use in the present composition may be of any type which is suitable for providing adequate dispersion of the foam stabilizer and other solids throughout the composition such that same may be discharge through a standard actuator, or a mechanical break-up actuator if a gas propellant is utilized. Adequate solution of the composition is achieved when the foam stabilizer, which will be discussed presently, is fully dissolved. Further, the surfactant must be capable of inducing foam production upon discharge of the composition from the containment means. If the polymers selected are those which are already in the form of an aqueous dispersion, e.g., the Rohm and Haas W.L. series, the amount of surfactant associated with the polymer resin is generally sufficient. However, and depending upon the degree of foaming desired, it may be desirable to introduce additional amounts of surfactant into the composition. Further, as additional components are added to the composition, such as pigments, increased amounts of surfactant, as a dispersant, may be advantageously added. Typical surfactants which may be used in the aerosol compositions of the present application lauryl sulfate, lauryl ether sulfate, and mixtures thereof. Exemplar of a surfactant which may be added to the composition is Sipon NA-61 (sodium laureth(3) sulfate). The amount of surfactant present generally ranges from about 0.1 to about 15 wt. percent, preferably about 1 to about 10 wt. percent, and most preferably about 1 to about 5 wt. percent of the solution.

The present composition further incorporates a foam stabilizer or stabilizers which, as their name implies, act in concert with the other components to stabilize the resulting foam for a predetermined period of time such that foam longevity is enhanced. Suitable foam stabilizers include the higher fatty alcohols such as decyl alcohol, lauryl alcohol, tetradecyl alcohol, cetyl alcohol, oleyl alcohol and stearyl alcohol, fatty monoglycerides such as glycerol monolaurate and glycerol monostearate, amides such as stearic acid amide and stearic acid ethanolamide, amines such as alkylmethylamine oxide, N-higher alkyl hydroxyalkyl carbamates such as N-dodecylhydroxyethyl carbamate, and Sulfobetaines® such as alkyl amino propyl sulfonic acids. Advantageously, the higher fatty alcohols, such as cetyl and stearyl alcohol, are employed.

The preferred embodiment of the present composition employs both cetyl and stearyl alcohol as the stabilizing agent. The rationale behind this is in part due to the characteristics of the individual components as well as their collective effect on the composition. More specifically, cetyl alcohol (I-hexadecanol), by itself, will stabilize the composition and the resulting foam adequately at low temperatures, i.e., about 50 to 100° F. When exposed to higher temperatures however, i.e., about 100 to about 120° F, the composition breaks down and is no longer adequately dispersed in water. It has been discovered that the addition of stearyl alcohol, which itself is not an outstanding stabilizer as compared to cetyl alcohol, will stabilize the dispersion even at these higher temperatures such that cetyl alcohol's sensitivity to the aforesaid high temperatures is overcome. Thus, the present invention has discovered a composition that is relatively insensitive to changes in temperature that might occur due to prolonged storage or production methods. The total amount of stabilizers present generally ranges from about 0.05 to about 10 wt. percent, preferably about 0.1 to about 5 wt. percent, and most preferably about 0.5 to about 3 wt. percent of the solution. When the two preferred components are used, the mixture should be about two parts cetyl alcohol to about one part stearyl alcohol.

One or more solvents may also be utilized in the present composition, these components being adapted for solvating the aforesaid foam stabilizing agents. As will be explained in greater detail in a subsequent section, salvation of these stabilizing agents is required so that the composition of the present invention may be properly prepared. Any solvent or combination of solvents may be used which acts to dissolves the stabilizer and coalesce the polymer. Examples of these solvents include lower monoalkyl ethers of ethylene or propylene glycol, such as propylene glycol methyl ether and ethylene glycol butyl ether. Generally, these solvents are present in an amount that is sufficient to fully solvate the foam stabilizing component, however, additional amounts may be added if desired. The specific amount used in the present invention will typically range from about 3 wt. percent to about 15 wt. percent, advantageously from about 6 wt. percent to about 12 wt. percent, and most preferably about 7 to about 10 wt. percent of the composition.

While the aforementioned compositions will, upon discharge, produce a white colored foam, a pigment may be further included in the composition such that a color is imparted to the resulting foam. As such, an amount of pigment which is appropriate to obtain the desired degree of pigmentation will be included in the composition. The pigment may comprise any convenient pigment which will provide a colored resulting film, for example, organic, 10 inorganic, fluorescent, metallic pigments, and mixtures thereof. The amount of pigment, when same is included in the present inventive composition, ranges from about 0.5 to about 25 wt. percent, preferably from about 1 to about 15 wt. percent, and most preferably about 2 to about 10 wt. percent of the composition. However, the overall composition solids content should be kept in mind when adding pigments to the composition. This is especially the case when a container having a standard actuator is used.

When a pigment is included in the composition, the quantity of polymer will generally be lower, e.g., toward the lower end of the range recited previously. If a pigment is not included, the amount of polymer will generally be higher, e.g., toward the higher end of the previously recited range.

Thickeners may also be employed in the composition such as natural or synthetic gums, e.g., xanthan gum, starch, associative thickeners, and mixtures thereof. These components are used to adjust the viscosity of the composition to a predetermined range, this range ultimately affecting the degree of foam "billowing." As such, the addition of this component will have an effect upon the height of the foam produced. Further, this thickener serves to reduce water drainage from the resulting foam, this tending to positively effect the stability of the foam. These thickeners are usually present in a total amount ranging from about 0.05 to about 2 wt. percent, preferably about 0.1 to 1 wt. percent, and most preferably about 0.1 to about 0.5 wt. percent of the composition.

A foam-boosting agent may be optionally employed such that the foam forming characteristics of the present invention are enhanced. Specifically, this additive increases the viscosity of the aqueous phase such that foaming of the composition during discharge is enhanced. Generally, any known enhancer may be used, with alkanolamides and amine oxides being advantageously employed. Particularly preferred is Cyclomide DC 212 (Costec) which consists of Cocamide DEA (2:1 diethanolamide). Examples of other foam-enhancing components include detaines, amides, and mixtures of these which have the requisite effect during discharge. While the foaming agent is generally used in an amount sufficient to provide the desired level of foaming of the composition upon discharge, quantities ranging from about 0.1 to about 3 wt. percent, preferably about 0.1 wt. percent to about 2 wt. percent, and most preferably about 0.5 to about 1.5 wt. percent of the composition are typically employed.

Eliminating corrosion of the inside of aerosol cans is also a concern with aerosol compositions. One method of eliminating or reducing such corrosion is to provide the composition with an overall pH value in the range of from about 7.2 to about 10 by introducing a suitable stabilizing component, such as ammonia or morpholine, in the composition in a corrosion inhibiting amount, generally up to about 1 wt. percent of the composition. This effect may also be provided with a component such as Raybo 60 (Raybo Chemical Company) the active ingredient of which is an alkylamine. Other suitable inhibitors include amines, nitroparaffins, nitrites, and mixtures thereof. This type of component inhibits can corrosion and is usually present in a corrosion inhibiting amount, generally from about 0.1 to about 4 wt. percent and preferably from about 0.5 to about 3 wt. percent of the composition. Most preferably, the corrosion inhibitor is about 0.5 to about 1.5 wt. percent of the composition.

A preservative may also be added to increase the longevity of the present composition. Although any type of preservative which acts to prevent bacterial and other unwanted growth may be used, Cosan 145 (Cosan Chemical Company, Carlstadt, New Jersey) may be advantageously employed. Cosan 145 is a liquid organic preservative recommended for use in resin emulsions which provides antimicrobial protection to water-based systems. This type of component is usually present in a bacterial or growth inhibiting amount, this amount usually ranging from about 0.05 to about 2 wt. percent and preferably from about 0.1 to about 1 wt. percent of the composition. Most preferably, the preservative is about 0.5 to about 1.5 wt. percent of the composition.

The procedure by which the present composition is produced is critical to the stability of the resulting foam. The general procedure for producing the foam composition comprises mixing all but about one percent of the solvent, stabilizers, and surfactant until the stabilizers are solvated. About one-third of the water is then added to the aforesaid mixture to form a second mixture. This second mixture is then agitated until all components are thoroughly mixed. After the agitation of this second mixture, this second mixture is slowly added to a third mixture containing a resin emulsion and about one-third of the water. The remaining water and additional components (except for the thickeners and remaining solvents) are added to form a fourth mixture. Finally, the thickener and the remaining solvent should be premixed such that the formation of lumps is prevented. This thickener/solvent mixture is then added to the fourth mixture to form the final composition. This composition is then agitated until its viscosity stabilizes. The final composition is then introduced into a suitable aserosol container having a mechanical break-up actuator (to produce the desired foaming of the composition if a gas propellant is used) or a standard actuator (if a liquid propellant is used) with the propellant then being injected therein.

The following example illustrates the aforesaid method of producing an embodiment of the present invention.

EXAMPLE

| Component | Wt. percent of total |
| --- | --- |
| A. Mix the following components until the alcohols are in solution: | |
| Propylene glycol monomethyl ether | 9.08 |
| Cetyl alcohol | 1.19 |
| Stearyl alcohol | .59 |
| Sipon NA-61 | 2.00 |
| B. Add the following and mix well: | |
| Water | 14.84 |
| C. Add the resulting mixture to the following while agitating: | |
| Rhoplex W.L. 91 | 40.85 |
| Water | 16.78 |
| D. Mix the composition well and add the following: | |
| Cyclomide DC 212 | .95 |
| Cosan 145 | .24 |
| Raybo 60 | 1.10 |
| Water | 11.88 |
| E. Pre-mix and add to the composition: | |
| Propylene glycol | .26 |
| Xanthan gum | .24 |
| F. Mix the resulting composition for about thirty minutes until the viscosity stabilizes. | |
| TOTAL | 100.00 |
| G. The propellant was then added in the aforementioned percentages by methods known to those skilled in the art. | |

The aerosol composition described above, which is but one example of the compositions contemplated by the present invention, remained as a foam for ninety days. At the end of this period the foam was stable, however the experiment was terminated due to time constraints. During this time, the foam was not disturbed by external forces, e.g., rain, heavy winds, or compressive force such as that delivered by walking onto the foam.

What we claim is:

1. An aerosol composition which provides a stable yet non-permanent foam upon discharge from a suitable containment means, said composition comprising (a) a propellant (b) water, (c) a water-insoluble polymer, (d) an anionic surfactant, (e) a foam stabilizing agent which stabilizes the foam produced upon discharge of the composition which stabilizes the foam produced upon discharge of the composition from said containment means yet allows the foam to become unstable and collapse upon exposure to water and (f) a solvent which solvates said foam stabilizing agent.

2. The aerosol composition of claim 2, wherein said liquid propellant comprises at least one hydrocarbon propellant.

3. The aerosol composition of claim 3, wherein said propellant is present in an amount ranging from about 5 to about 40 wt. percent of said composition.

4. The aerosol composition of claim 1, wherein said liquid propellant is selected from the group consisting of methane, ethane, propane, butane, and mixtures thereof.

5. The aerosol composition of claim 4, wherein said liquid propellant is present in an amount ranging from about 15 to about 25 wt. percent of said composition.

6. The aerosol composition of claim 1, wherein said propellant is present in an amount sufficient to expel substantially all of said aerosol composition from the containment means.

7. The aerosol composition of claim 1, wherein said water-insoluble polymer is an acrylic polymer.

8. The aerosol composition of claim 7, wherein said polymer comprises an interpolymer of (i) units from at least one neutral free-radical polymerizable ester having a vinylidene group attached to the functional group, which ester by itself yields a soft linear polymer, (ii) units from at least one neutral polymerizable aromatic monovinylidene compound which by itself yields a hard polymer, and (iii) units from at least one neutral polymerizable aliphatic monovinylidene compound substituted by a cyano group and which by itself yields a hard polymer.

9. The aerosol composition of claim 8, wherein said polymer is a copolymer of styrene, acrylonitrile, and an acrylic ester.

10. The aerosol composition of claim 8, wherein said polymer is present in an amount ranging from about 1 wt. percent to about 25 wt. percent of said composition.

11. The aerosol composition of claim 1, wherein surfactant is present in an amount sufficient to adequately disperse solid components throughout said composition and induce the production of a foam upon discharge of said composition from the containment means.

12. The aerosol composition of claim 1, wherein said surfactant is selected from the group consisting of lauryl sulfate, lauryl ether sulfate, and mixtures thereof.

13. The aerosol composition of claim 12, wherein said surfactant is present in an amount ranging from about 1 to about 10 wt. percent of said composition.

14. The aerosol composition of claim 1, wherein said surfactant is present in an amount ranging from about 0.1 to about 15 wt. percent of said composition.

15. The aerosol composition of claim 1, wherein said surfactant is sodium laureth(3) sulfate.

16. The aerosol composition of claim 15, wherein said surfactant is present in an amount ranging from about 1 to about 5 wt. percent of said composition.

17. The aerosol composition of claim 1, wherein said foam stabilizer is present in an amount sufficient to stabilize said foam for a predetermined period of time.

18. The foam stabilizing agent of claim 1, wherein agent is present in an amount ranging from about 0.05 to about 10 wt. percent of said composition.

19. The aerosol composition of claim 1, wherein said foam stabilizing agent selected from the group consisting of higher fatty alcohols, fatty monoglycerides, amines, higher alkyl hydroxyalkyl carbamates, alkyl amino propyl, sulfonic acids, and mixtures thereof.

20. The aerosol composition of claim 19, wherein said stabilizing agent is present in an amount ranging from about 0.1 to about 5 wt. percent of the composition.

21. The aerosol composition of claim 1, wherein said stabilizing agent is a mixture of stearyl alcohol and cetyl alcohol.

22. The aerosol composition of claim 21, wherein the ratio of cetyl alcohol to stearyl alcohol is about 2:1, said alcohols being present in an amount ranging from about 0.5 to about 3 wt. percent of the composition.

23. The aerosol composition of claim 1, wherein said solvent is one or more components that adequately solvate said stabilizing agent.

24. The aerosol composition of claim 1, wherein said solvent is present in an amount such that said composition is adequately solvated.

25. The aerosol composition of claim 1, wherein said solvent is selected from the group consisting of lower monoalkyl ethers of ethylene glycol, lower monoalkyl ethers of propylene glycol, ethers of diethylene glycol, and mixtures thereof.

26. The aerosol composition of claim 25, wherein said solvent is present in an amount ranging from about 6 to about 12 wt. percent of said composition.

27. The aerosol composition of claim 1, wherein said solvent is present in an amount ranging from about 3 to about 15 wt. percent of said composition.

28. The aerosol composition of claim 1, wherein said solvent is propylene glycol monomethyl ether.

29. The aerosol composition of claim 28, wherein said solvent is present in an amount ranging from about 8 to about 10 wt. percent of said composition.

30. The aerosol composition of claim 1, further comprising a pigment.

31. The aerosol composition of claim 30, wherein said pigment is present in an amount ranging from about 0.5 wt. percent to about 25 wt. percent of said composition.

32. The aerosol composition of claim 30, wherein said pigment is selected from the group consisting of organic pigments, inorganic pigments, metallic pigments, fluorescent pigments, and mixtures thereof.

33. The aerosol composition of claim 1, further comprising an associative thickener.

34. The aerosol composition of claim 33, further comprising a fluorescent pigment.

35. The aerosol composition of claim 1, further comprising a foam boosting agent.

36. The aerosol composition of claim 35, wherein said foam boosting agent is present in an amount ranging from about 0.1 to about 3 wt. percent of the composition.

37. The aerosol composition of claim 35, wherein said foam boosting agent is selected from the group consisting of amides, amine oxides, betaines, and mixtures thereof.

38. The aerosol composition of claim 37, wherein said foam boosting agent is present in an amount ranging from about 0.1 wt. percent to about 2 wt. percent of said composition.

39. The aerosol composition of claim 35, wherein said foam boosting agent is 2:1 diethanolamide.

40. The aerosol composition of claim 1, further comprising an aerosol can corrosion inhibitor.

41. The aerosol composition of claim 40, wherein said aerosol can corrosion inhibitor is present in a corrosion inhibiting amount.

42. The aerosol composition of claim 40, wherein said aerosol can corrosion inhibitor is present in ah amount ranging from about 0.1 wt. percent to about 4 wt. percent of said composition.

43. The aerosol composition of claim 40, wherein said aerosol can corrosion inhibitor is selected from the group consisting of amines, nitroparaffins, nitrites, and mixtures thereof.

44. The aerosol composition of claim 1, further comprising a thickener.

45. The aerosol composition of claim 44, wherein said foam boosting agent is present in an amount ranging from about 0.5 wt. percent to about 1.5 wt. percent of said composition.

46. The aerosol composition of claim 44, wherein said thickener is present in an amount ranging from about 0.05 wt. percent to about 2 wt. percent of said composition.

47. The aerosol composition of claim 44, wherein said thickener is selected from the group consisting of natural gums, synthetic gums, associative thickeners, starch, and mixtures thereof.

48. The aerosol composition according to claim 1, wherein said composition provides a foam which remains stable for at least 90 days if undisturbed.

49. The aerosol composition of claim 1, wherein said foam stabilizer is at least one higher fatty alcohol.

50. An aerosol composition which provides a foam upon discharge from a suitable containment means, said composition comprising (a) a liquid propellant in an amount ranging from about 10 to about 30 wt. percent of the composition, (b) water, (c) a water-insoluble acrylic polymer present in an amount ranging from about 2 to about 15 wt. percent of the composition, (d) a surfactant present in an amount ranging from about 0.1 to about 15 wt. percent of the composition which stabilizes the foam produced upon discharge of the composition from said containment means yet allows the foam to become unstable and collapse upon exposure to water, (e) a foam stabilizing agent present in an amount ranging from about 0.05 to about 10 wt. percent of the composition, and (f) a solvent which solvates said foam stabilizing agent present in an amount ranging from about 3 to about 15 wt. percent of the composition. a thickener.

51. An aerosol composition adapted for providing a foam upon discharge from a suitable containment means, said composition comprising (a) a liquid propellant in an amount ranging from about 15 to about 25 wt. percent of the composition, (b) water, (c) a water-insoluble acrylic polymer comprising an interpolymer of (i) units from at least one neutral free-radical polymerizable ester having a vinylidene group attached to the functional group, which ester by itself yields a soft linear polymer, (ii) units from at least one neutral polymerizable aromatic monovinylidene compound which by itself yields a hard polymer, and (iii) units from at least one neutral polymerizable aliphatic monovinylidene compound substituted by a cyano group and which by itself yields a hard polymer present in an amount ranging from about 3 to about 15 wt. percent of the composition, (d) a surfactant selected from the group consisting of lauryl sulfate, lauryl ether sulfate, and mixtures thereof present in an amount ranging from about 1 to about 10 wt. percent of the composition, (e) a foam stabilizing agent selected from the group consisting of higher fatty alcohols, fatty monoglycerides, amines, n-higher alkyl hydroxyalkyl carbamates, alkyl amino propyl, sulfonic acids, and mixtures thereof present in an amount ranging from about 0.1 to about 5 wt. percent of the composition, and (f) a solvent adapted for solvating said foam stabilizing agent selected from the group consisting of lower monoalkyl ethers of ethylene glycol, lower monoalkyl ethers of propylene glycol, and mixtures thereof present in an amount ranging from about 6 to about 12 wt. percent of the composition.

52. An aerosol composition adapted for providing a foam upon discharge from a suitable containment means, said composition comprising (a) a liquid propellant selected from the group consisting of methane, ethane, propane, butane, and mixtures thereof present in an amount ranging from about 18 to about 22 wt. percent of the composition, (b) water, (c) a water-insoluble acrylic polymer comprising a copolymer of styrene, acrylonitrile, and an acrylic ester present in an amount ranging from about 5 to about 15 wt. percent of the composition, (d) a surfactant selected from the group consisting of lauryl sulfate, lauryl ether sulfate, and mixtures thereof; and mixtures thereof present in an amount ranging from about 1 to about 5 wt. percent of the composition, (e) a foam stabilizing agent selected from the group consisting of cetyl alcohol, stearyl alcohol, and mixtures thereof present in an amount ranging from about 0.5 to about 3 wt. percent of the composition, and (f) a solvent adapted for solvating said foam stabilizing agent selected from the group consisting of ethylene glycol monomethyl ether, propylene glycol monomethyl ether, and mixtures thereof present in an amount ranging from about 8 to about 10 wt. percent of the composition.

* * * * *

UNITED STATES PATENT AND TRADEMARK OFFICE
CERTIFICATE OF CORRECTION

PATENT NO. : 5,156,765
DATED : October 20, 1992
INVENTOR(S) : THOMAS J. SMRT AND WALTER S. MIERZWINSKI It is certified that error appears in the above-identified patent and that said Letters Patent is hereby corrected as shown below:

Column 1, line 19, after "able" add -- to --;

Column 5, line 46, delete "I5";

Column 6, line 41, delete the letter "I" and substitute therefor the numeral -- 1 --;

Column 7, line 22, delete "10"; and

Column 7, line 51, delete the letter "I" and substitute therefor the numeral -- 1 --.

Column 9, lines 45 & 46, delete the second phrase "which stabilizes the foam produced upon discharge of the composition";

Column 9, line 50, delete "2" and substitute therefor -- 1 --;

Column 9, line 53, delete "3" and substitute therefor -- 2 --;

Column 10, line 18, after "wherein" add -- said --;

Column 10, line 40, after "wherein" add -- said --;

UNITED STATES PATENT AND TRADEMARK OFFICE
CERTIFICATE OF CORRECTION

PATENT NO. : 5,156,765

DATED : October 20, 1992

INVENTOR(S) : THOMAS J. SMRT AND WALTER S. MIERZWINSKI

It is certified that error appears in the above-identified patent and that said Letters Patent is hereby corrected as shown below:

Column 11, line 33, delete "betaines" and substitute therefor -- detaines --;

Column 11, line 47, delete "ah" and substitute therefor -- an --;

Column 11, line 56, delete "44" and substitute therefor -- 35 --;

Column 12, lines 14-18 delete the phrase "which stabilizes the foam produced upon discharge of the composition from said containment means yet allows the foam to become unstable and collapse upon exposure to water" and insert the phrase in sub-part (e), after the word "composition,".

Signed and Sealed this

Nineteenth Day of October, 1993

BRUCE LEHMAN

*Commissioner of Patents and Trademarks*

*Attest:*

*Attesting Officer*